W. H. PARKS.
COW PEA CUTTER.
APPLICATION FILED APR. 4, 1912.
1,056,117.
Patented Mar. 18, 1913.
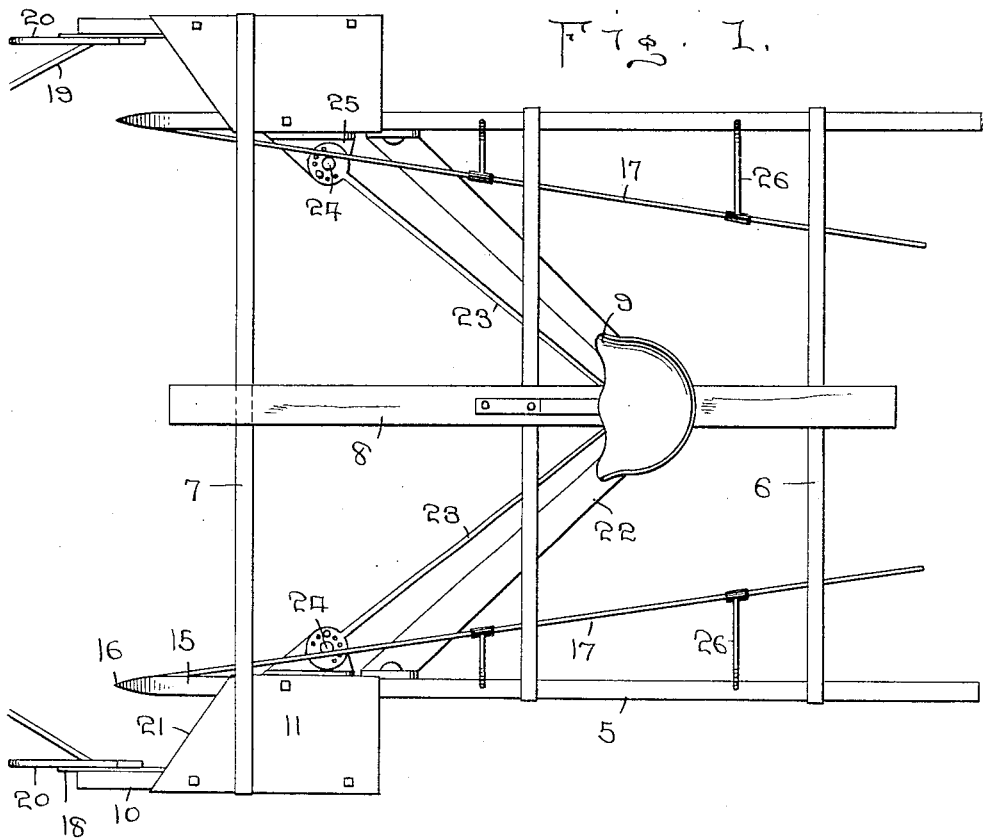
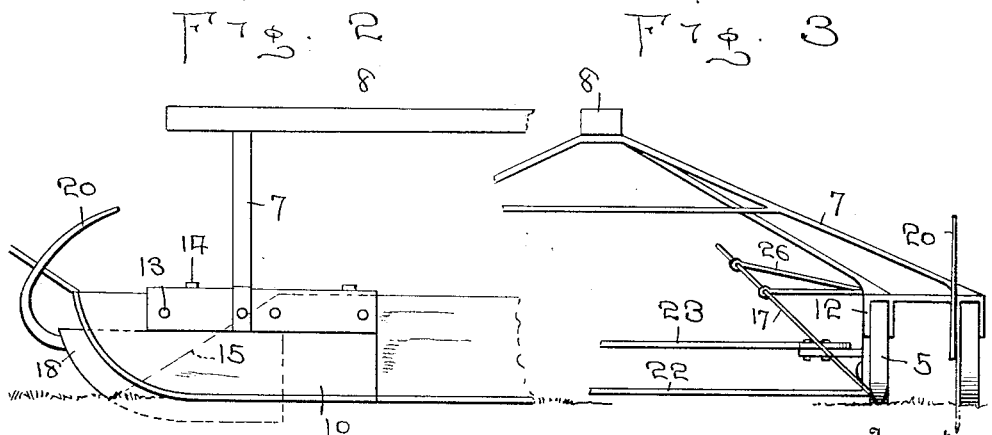

UNITED STATES PATENT OFFICE.

WILLIAM HARRISON PARKS, OF TYRO, KANSAS.

COW-PEA CUTTER.

1,056,117.

Specification of Letters Patent.  Patented Mar. 18, 1913.

Application filed April 4, 1912. Serial No. 688,458.

*To all whom it may concern:*

Be it known that I, WILLIAM HARRISON PARKS, a citizen of the United States, residing at Tyro, in the county of Montgomery and State of Kansas, have invented certain new and useful Improvements in Cow-Pea Cutters; and I do hereby declare the following to be a full, clear, and exact description of the invention, such as will enable others skilled in the art to which it appertains to make and use the same.

This invention relates to harvesters, and it more particularly relates to vine harvesters, and still more specifically to a machine designed for harvesting cow peas, soy beans, navy beans, peas and the like.

An object of the invention is to provide a machine having means for lifting the upper portions of the vines from the ground while the stem portions, immediately above the roots, are cut off, and thereby to avoid gathering the roots with the vines.

A further object is to provide vertical cutters whereby the vines being harvested are separated from the vines which are to be harvested by succeeding operations.

A still further object of the invention is to provide means, associated with the cutting means, for collecting the harvested vines into windrows.

A still further object is to provide a machine of this character which is rigidly and substantially constructed, and withal, is simple of construction and thoroughly efficient in operation.

Other objects and advantages will be recited hereinafter and in the claims.

In the accompanying drawings which form a part of this application, Figure 1 is a top plan view of the harvester embodying my invention. Fig. 2 is a fragmental side elevation view, and, Fig. 3 is a front elevation of a fragmental portion of the machine.

In the drawings, in which similar reference characters designate similar parts throughout the several views, a pair of sled runners or sliding supports 5, connected by arched yokes 6 and 7 constitute the main frame of the machine. The yokes preferably have their top middle portions connected by the beam 8, secured thereto and carrying a driver's seat 9. Secondary or outer runners 10 are rigidly connected to the runners 5 by any proper means, such as connecting plates 11, the latter being provided with depending flanges 12, which embrace the top portions of the respective runners, being secured thereto by any proper means, as at 13 and 14.

The long or inner runners 5 have downwardly inclined vertical end portions 15, carrying the pointed ends 16 which pass under the vines as the machine is drawn forward, the inclined portions 15 raising said vines, so that the long runners 5 and the lifter rods 17 pass thereunder. During the foregoing operation, the vertical cutters 18 sever the lifted vines, or the vines being harvested, from the adjacent vines which are to remain until the next succeeding operation of the harvester.

Any proper draft medium may be provided, as at 19, to which any suitable draft animal or appliance may be connected.

It is well known that vines of the character described are very irregularly distributed; that is, some of said vines will be standing while others are lying flat upon the ground, and others in intermediate positions; so, in order to part the standing and intermediately positioned vines, I have provided curved parting rods 20, approximately on the same vertical plane with the vertical knives.

The connecting plates 11 have their forward edges inwardly and rearwardly inclined as at 21, so that the vines which have been severed by the blades 18 and raised by the inclined surfaces 15 are caused to move inward by means of the surfaces 21. As the machine is drawn forward, the substantially horizontal stalk cutting knives 22 are brought into contact with the stalks or stems of the vines, at a point a short distance above the roots thereof, and the vines between the runners 5 now being entirely separated from the remaining vines and from their stems, are brought together into a windrow, by means of the supporting rod 17 and the auxiliary supporting rods 23. These auxiliary supporting rods are adapted for horizontal adjustment on the pivots 24, the latter being carried by brackets 25, secured on the inside vertical surfaces of the runners 5. Any proper and well known means of adjustment may be provided for the knives 18 and 22, whereby they may be raised or lowered, and they may be easily removed and replaced, when necessary for repairing, sharpening, etc.

The supporting rod 17 may be supported by posts 26. The yokes 6 and 7 may be made from strips of wrought iron or steel, but they are preferably made solid and integral from malleable iron, while the plates 11 may be made from similar material.

It will be seen that the harvester described is fully capable of attaining the foregoing objects, and in a thoroughly practical and efficient manner.

I do not limit my invention to the exact details of construction, combination and arrangement of parts as described and illustrated, but my invention may only be limited by a reasonable interpretation of the following claims.

I claim:—

1. In a vine harvester, a pair of runners having their forward ends pointed and inclined, a pair of outer runners having vertical knives thereon, connecting plates securely uniting the first said runners with the last said runners, a draft medium connected to the runners, supporting rods associated with the runners, and horizontal knives under the supporting rods for severing the stems of the vines while in raised position.

2. In a vine harvester, a main frame including a pair of inner sliding supports and a pair of outer sliding supports connected by proper means, blades carried by the outer sliding supports, blades carried by the inner sliding supports, and means carried by the inner sliding supports and including the last said blades for simultaneously lifting the upper portions of vines and severing the lower portions thereof.

3. In a vine harvesting machine, a pair of inner runners and a pair of outer runners appropriately connected by means of a plate, draft means associated with the forward end of the machine, said inner runners provided with means for raising the upper portions of the vines, the forward edges of said plates being inwardly inclined for guiding the vines inwardly, and means associated with the runners for supporting the stems of the vines while in raised position.

4. In a vine harvester, a main frame including a pair of sliding supports, vine-parting and vine-severing means carried by the sliding supports, a second pair of sliding supports connected to the first said sliding supports and including means for raising the upper portions of the vines, and means connected to the last said sliding supports for severing the stems of the vines between their roots and their raised portions.

5. In a vine harvester, a pair of runners connected by a pair of arched yokes, a second pair of runners connected by an arched yoke, the first said runners and the second pair of runners being connected together by means of horizontal plates, a draft medium associated with the runners, vine supporting means carried by the runners and vine lifting means associated with the runners, whereby the severed vines are arranged in windrows.

In testimony whereof I have signed my name to this specification in the presence of two subscribing witnesses.

WILLIAM HARRISON PARKS.

Witnesses:
 IRA BRADFORD CHADWICK,
 J. C. LENHART.

---

Copies of this patent may be obtained for five cents each, by addressing the "Commissioner of Patents, Washington, D. C."